US009064667B2

(12) United States Patent
Manohara et al.

(10) Patent No.: US 9,064,667 B2
(45) Date of Patent: Jun. 23, 2015

(54) SYSTEMS AND METHODS FOR IMPLEMENTING ROBUST CARBON NANOTUBE-BASED FIELD EMITTERS (71) Applicant: California Institute of Technology, Pasadena, CA (US)

(72) Inventors: Harish Manohara, Arcadia, CA (US); Valerie Kristof, Altadena, CA (US); Risaku Toda, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/081,932

(22) Filed: Nov. 15, 2013

(65) Prior Publication Data

US 2014/0148074 A1  May 29, 2014

Related U.S. Application Data (60) Provisional application No. 61/726,865, filed on Nov. 15, 2012.

(51) Int. Cl.
H01J 9/04 (2006.01)
H01J 9/02 (2006.01)
B82Y 40/00 (2011.01)

(52) U.S. Cl.
CPC .............. *H01J 9/025* (2013.01); *Y10S 977/939* (2013.01); *H01J 9/022* (2013.01); *B82Y 40/00* (2013.01)

(58) Field of Classification Search
CPC ....... H01J 9/025; H01J 9/022; Y10S 977/939; B82Y 99/00
USPC ...................................... 445/50, 51; 977/939
See application file for complete search history.

(56) References Cited

U.S. PATENT DOCUMENTS

| 7,834,530 | B2 | 11/2010 | Manohara et al. | |
| 8,796,932 | B2 | 8/2014 | Manohara et al. | |
| 2003/0036244 | A1 | 2/2003 | Jones et al. | |
| 2003/0203139 | A1* | 10/2003 | Ren et al. | 428/34.3 |

(Continued)

FOREIGN PATENT DOCUMENTS

| JP | 2001143645 A | 5/2001 |
| JP | 2008251548 A | 10/2008 |

(Continued)

OTHER PUBLICATIONS

International Search Report and Written Opinion for International Application No. PCT/US2013/070420, International Filing Date Nov. 15, 2013, Search Completed Feb. 27, 2014, Mailed Feb. 27, 2014, 9 pgs.
International Search Report and Written Opinion for International Application No. PCT/US2013/071323, Search Completed Mar. 6, 2014, 11 pgs.
International Search Report and Written Opinion for International Application PCT/US2013/031285, completed Jun. 26, 2013, 9 pgs.
Chen, "Approximate Calculating Methods Concerning the Electron Transit Time for a Vacuum Microelectronics Triode," J. Phys. D: Appl. Phys 33 (2000) L39-L43, Nov. 24, 1999.
Ghosh et al., "Nanodiamond lateral field emission vacuum logic OR gate", Electronics Letters, Aug. 4, 2011, vol. 47, No. 16, 2 pgs.

(Continued)

*Primary Examiner* — Anh Mai
*Assistant Examiner* — Glenn Zimmerman
(74) *Attorney, Agent, or Firm* — KPPB LLP (57) ABSTRACT

Systems and methods in accordance with embodiments of the invention implement carbon nanotube-based field emitters. In one embodiment, a method of fabricating a carbon nanotube field emitter includes: patterning a substrate with a catalyst, where the substrate has thereon disposed a diffusion barrier layer; growing a plurality of carbon nanotubes on at least a portion of the patterned catalyst; and heating the substrate to an extent where it begins to soften such that at least a portion of at least one carbon nanotube becomes enveloped by the softened substrate.

28 Claims, 10 Drawing Sheets

(56) References Cited

U.S. PATENT DOCUMENTS

| | | |
|---|---|---|
| 2005/0248256 A1 | 11/2005 | Song et al. |
| 2006/0038299 A1 | 2/2006 | Hirakata et al. |
| 2006/0185595 A1* | 8/2006 | Coll et al. ............... 118/724 |
| 2007/0284089 A1 | 12/2007 | Vadakkanmaruveedu et al. |
| 2008/0061700 A1 | 3/2008 | Blick |
| 2008/0090183 A1* | 4/2008 | Zhu et al. ............... 430/324 |
| 2008/0180883 A1 | 7/2008 | Palusinski et al. |
| 2009/0136682 A1 | 5/2009 | Branton et al. |
| 2010/0009511 A1 | 1/2010 | Quinlan et al. |
| 2010/0019647 A1 | 1/2010 | Hao et al. |
| 2010/0085672 A1 | 4/2010 | Savin et al. |
| 2010/0140588 A1* | 6/2010 | Hongo ............... 257/24 |
| 2010/0141112 A1 | 6/2010 | Wang et al. |
| 2010/0264032 A1 | 10/2010 | Bazant |
| 2011/0057164 A1* | 3/2011 | Toda et al. ............... 257/10 |
| 2011/0101299 A1* | 5/2011 | Liang ............... 257/10 |
| 2011/0121227 A1 | 5/2011 | Keller et al. |
| 2013/0136860 A1* | 5/2013 | Chen et al. ............... 427/249.1 |
| 2013/0247678 A1 | 9/2013 | Manohara et al. |
| 2013/0249598 A1 | 9/2013 | Manohara et al. |
| 2013/0250479 A1 | 9/2013 | Manohara et al. |
| 2014/0141686 A1 | 5/2014 | Manohara et al. |

FOREIGN PATENT DOCUMENTS

| | | |
|---|---|---|
| WO | 2012019309 A1 | 2/2012 |
| WO | 2013142246 A1 | 9/2013 |
| WO | 2014078732 A1 | 5/2014 |
| WO | 2014081972 | 5/2014 |

OTHER PUBLICATIONS

Grzybowski, et al., "High Temperature Performance of Polymer Film Capacitors", Journal of Microelectronic Packaging, vol. 1, 1998, pp. 711-716.

Manohara et al., "Carbon Nanotube-Based Digital Vacuum Electronics and Miniature Instrumentation for Space Exploration", Proc. of SPIE vol. 7594, 75940Q-1, Apr. 13, 2010.

Manohara et al., "Carbon Nanotube-Based High Temperature Vacuum Microelectronics for E&P Applications", SPE 156947, Jun. 12, 2012.

Manohara et al., "11.2: "Digital" Vacuum Microelectronics: Carbon Nanotube-Gased Inverse Majority Gates for High Temperature Applications", IEEE, 2010, pp. 203-204.

Nusil Silicone Technology LLC, "Conductive Silicones in Elevated Temperatures", 5 pgs, Dec. 4, 2014.

Sergent, "Discrete Passive Components for Hybrid Circuits, Chapter 8, 40 pgs", Dec. 4, 2014.

Wacker, "High-Performance Silicones for Transmission and Distribution", 52 pgs, Dec. 4, 2014.

Zhang et al., "Lateral vacuum microelectronic logic gate design", J. Micromech. Microeng., 1991, pp. 126-134.

Manohara, Harish, et al., "High-Current-Density Field Emitters Based on Arrays of Carbon Nanotube Bundles," Journal of Vacuum Science and Technology B, vol. 23 (1), pp. 157-161 (2005).

* cited by examiner

FIG. 5

SYSTEMS AND METHODS FOR IMPLEMENTING ROBUST CARBON NANOTUBE-BASED FIELD EMITTERS

CROSS-REFERENCE TO RELATED APPLICATIONS

The current application claims priority to U.S. Provisional Application No. 61/726,865, filed Nov. 15, 2012, the disclosure of which is incorporated herein by reference.

STATEMENT OF FEDERAL FUNDING

The invention described herein was made in the performance of work under a NASA contract, and is subject to the provisions of Public Law 96-517 (35 USC 202) in which the Contractor has elected to retain title.

FIELD OF THE INVENTION

The present invention generally relates to the adhesion of carbon nanotubes to a substrate to achieve a field emitter.

BACKGROUND

Field electron emission regards the emission of electrons, e.g. from a solid surface into a vacuum, based on the influence of an electric field. Field electron emission is relied on in a number of applications including microscopy, spectroscopy, and display technology. Recently, carbon nanotubes (CNTs) have been studied for their potential to provide for viable electron emitters. In particular, carbon nanotubes exhibit a host of properties that would suggest that they could make for excellent field emitters in a variety of applications. Nonetheless, CNT-based field emitters that are sufficiently robust and viable have yet to be developed. Accordingly, there exists a need for robust CNT-based field emitters that are practicable in at least a commercial and/or industrial sense, and methods for developing such field emitters.

SUMMARY OF THE INVENTION

Systems and methods in accordance with embodiments of the invention implement carbon nanotube-based field emitters. In one embodiment, a method of fabricating a carbon nanotube-based field emitter includes: patterning a substrate with a catalyst, where the substrate has thereon disposed a diffusion barrier layer; growing a plurality of carbon nanotubes on at least a portion of the patterned catalyst; and heating the substrate to an extent where it begins to soften such that at least a portion of at least one carbon nanotube becomes enveloped by the softened substrate.

In another embodiment, the method further includes allowing the grown carbon nanotubes and the softened substrate to cool to room temperature.

In yet another embodiment, the substrate includes titanium.

In still another embodiment, the diffusion barrier layer comprises aluminum oxide.

In yet still another embodiment, the diffusion barrier layer has a thickness of less than approximately 30 angstroms.

In a further embodiment, the catalyst is patterned on to the substrate in the form of a plurality of dots.

In a yet further embodiment, the catalyst pattern is created using a lift-off process.

In a still further embodiment, the thickness of the patterned catalyst is less than approximately 35 angstroms.

In a still yet further embodiment, the grown plurality of carbon nanotubes are in the form of bundles of carbon nanotubes, where each bundle of carbon nanotubes corresponds with one dot.

In another embodiment, the diameter of each bundle of carbon nanotubes is between approximately 1 micrometer and 2 micrometers.

In yet another embodiment, an edge of each bundle of carbon nanotubes is approximately 5 micrometers away from the nearest edge of an adjacent bundle of nanotubes.

In still another embodiment, the carbon nanotubes are grown using a gaseous hydrocarbon.

In still yet another embodiment, the gaseous hydrocarbon is one of: ethylene, acetylene, methane, and mixtures thereof.

In a further embodiment, the carbon nanotubes are grown at a temperature from between 575° C. and 775° C.

In a yet further embodiment, carbon nanotubes are grown for a duration of approximately 30 minutes.

In a still further embodiment, the carbon nanotubes are grown to a height of between approximately 25 micrometers and 50 micrometers.

In a still yet further embodiment, the method further includes the grown carbon nanotubes and the substrate to an argon flow prior to heating the substrate to an extent that it begins to soften.

In another embodiment, the heating of the substrate to an extent that it begins to soften occurs in an environment comprising a substantially inert gas.

In yet another embodiment, the substantially inert gas is argon.

In still another embodiment, the substrate is heated to 1050° C.

In still yet another embodiment, the substrate is heated for between approximately 15 minutes and approximately 30 minutes.

In a further embodiment, the catalyst comprises one of: Fe, Cu, Cr, and Al.

DETAILED DESCRIPTION

Turning now to the drawings, systems and methods for implementing carbon nanotube-based field emitters are illustrated. In many embodiments, a carbon nanotube-based field emitter is fabricated by growing carbon nanotubes onto a substrate, and thereafter heating the substrate to an extent that it softens such that at least one carbon nanotube becomes at least partially enveloped by the softened substrate; in this way, upon cooling, the carbon nanotubes can be bonded to the substrate in a manner that can allow the resultant field emitter to survive more rigorous operating conditions. In a number of embodiments, in fabricating a carbon nanotube-based field emitter, copper is deposited onto the grown carbon nanotubes and the substrate prior to the softening of the substrate. The deposition of copper can result in a field emitter that has improved bonding between the carbon nanotubes and the substrate, and can further result in a field emitter having improved emission characteristics. Accordingly, in many embodiments, a field emitter is provided that includes a plurality of carbon nanotubes that are disposed on a substrate such that they are each substantially orthogonally oriented with respect to the substrate, where at least a portion of at least one CNT wall is enveloped by the substrate such that the bond between the CNTs and the substrate is relatively strong.

Carbon nanotubes (CNTs) have many exceptional properties that make them attractive for a variety of applications. For instance, CNTs are amongst the strongest materials, as measured by tensile strength, and amongst the stiffest materials, as measured by elastic modulus. Additionally, CNTs have also been determined to possess outstanding electrical field emission properties, with high emission currents at low electric field strengths (e.g., applied field from 1-3 V/μm and an emission current ~0.1 mA from a single nanotube). Accordingly, CNTs are thereby attractive as cold-cathode field emission sources, especially for applications requiring high current densities (hundreds to thousands of amperes per cm$^2$) and lightweight packages (high frequency vacuum tube sources). Indeed, in U.S. patent application Ser. No. 11/137,725 (issued as U.S. Pat. No. 7,834,530), Manohara et al. disclose particular configurations for a high density carbon nanotube-based field emitter that provide favorable performance characteristics. For example, Manohara et al. disclose that field emitters that include a plurality of bundles of CNTs disposed on a substrate, where the diameter of the bundles is between approximately 1 μm and 2 μm, and where the bundles of CNTs are spaced at a distance of approximately 5 μm from one another, demonstrate particularly advantageous performance characteristics. U.S. Pat. No. 7,834,530 is hereby incorporated by reference.

Notably, carbon nanotube-based field emitters can be used in a variety of applications. For example, in U.S. patent application Ser. No. 13/796,943, Manohara et al. disclose microscale digital vacuum electronics that can advantageously incorporate carbon-nanotube based field emitters. Such microscale digital vacuum electronics can be beneficial relative to conventional CMOS-based electronics electronics, as they can readily be developed to be high-temperature tolerant and radiation insensitive. U.S. patent application Ser. No. 13/796,943 is hereby incorporated by reference.

Nonetheless, even though CNT-based field emitters have been proposed and developed, in many instances these field emitters have been deficient insofar as the CNTs were not sufficiently bonded to the underlying substrate. For example, in many cases, when the field emitters were subject to an electric field during operation, the electric field would cause at least some of the carbon nanotubes to detach from the substrate. In some instances, it was determined that pressures as light as between approximately 20 kPa and approximately 60 kPa were sufficient to detach CNTs from the underlying substrate. Thus, gently rubbing the surface of the substrate of these field emitters with a Q-tip could have been sufficient to dislodge the CNTs from the substrate. This fragility can be problematic in a number of respects. For example, the field emission performance of the field emitter can degrade as a function of the number of detached CNTs. Moreover, detached CNTs can potentially short circuit associated circuitry. In essence, the weak bond between CNTs and associated substrates of these CNT-based field emitters can undermine their potential to serve as robust field emitters that can withstand rigorous operating conditions.

Thus, in many embodiments of the invention, CNTs are more rigidly bonded to the underlying substrate to deter this result. For example, in many embodiments, after CNTs are grown onto a substrate, the substrate is heated so that it softens and thereby envelopes at least a portion of at least one CNT, e.g. at the interface of the CNT and the substrate. Accordingly, upon cooling, the corresponding CNT can be more sturdily attached to the substrate. In a number of embodiments, copper is deposited prior to the softening of the substrate to facilitate the bonding between the CNTs and the substrate, and to enhance field emission characteristics.

Processes for fabricating such robust CNT-based field emitters are now discussed in greater detail below.

Processes for Developing Robust CNT-based Field Emitters

In many embodiments of the invention, CNT-based field emitters are developed such that the strength of the adhesion between CNTs and a corresponding substrate is sufficient to withstand rigorous operating conditions. In many embodiments, the substrate is heated such that it softens and envelopes at least a portion of at least one CNT, such that upon cooling, the CNT is sufficiently adhered to the substrate.

Figure 1:
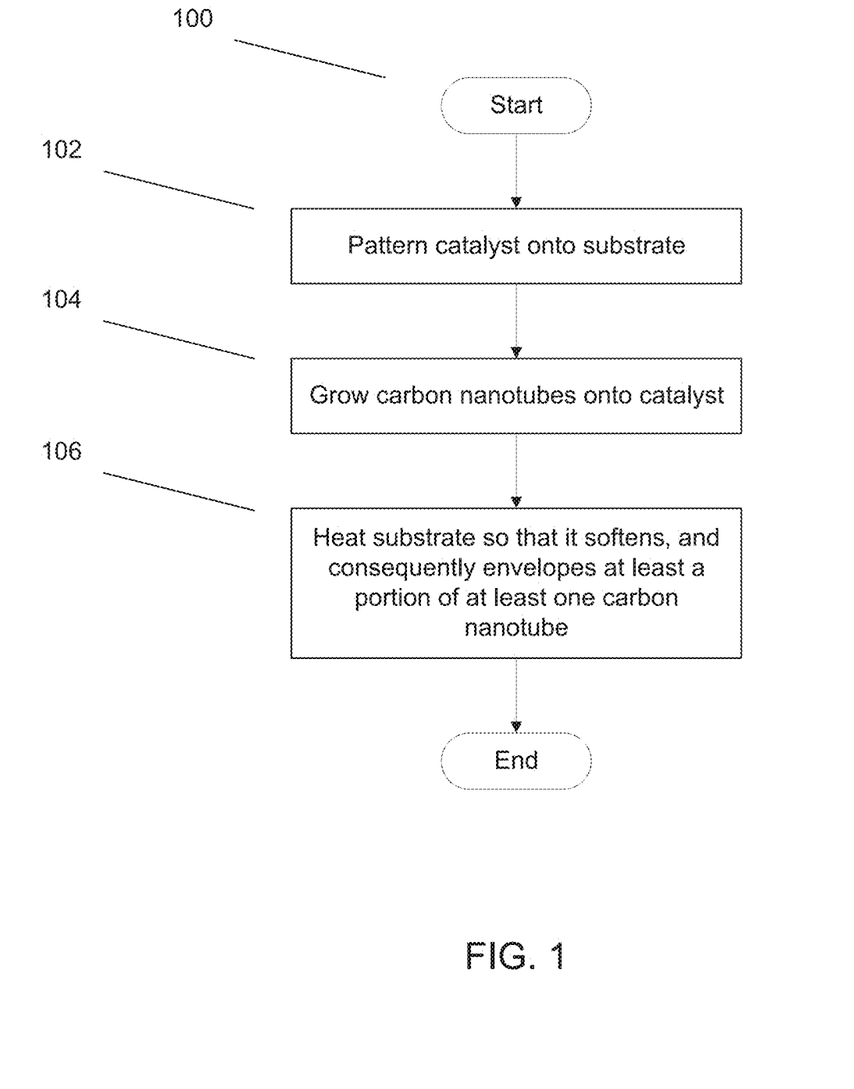
FIG. 1 illustrates a process for fabricating a carbon nanotube-based field emitter in accordance with embodiments of the invention.

A process for fabricating a robust CNT-based field emitter that includes softening the substrate such that it envelopes at least a portion of at least one CNT wall is illustrated in FIG. 1. The process 100 includes patterning (102) a substrate with a catalyst. In many embodiments, the substrate includes titanium. Titanium provides a number of advantages including that it does not inhibit the growth of CNTs, and that it also has favorable welding characteristics. In many embodiments, the surface roughness of the substrate is less than approximately 25 nm (r.m.s.)—a smooth surface can facilitate lithographic patterning. In some embodiments, a PECVD SiO2 layer is disposed on the substrate. In many embodiments, a diffusion barrier layer separates the substrate from the catalyst (note that in the context of this application, where a catalyst is patterned on to a layer that is layered on the substrate, such as a diffusion barrier layer, the catalyst is still considered to be patterned on the substrate). The diffusion barrier layer can help prevent the substrate from contaminating the growth of the carbon nanotubes. In many embodiments, the diffusion barrier layer includes an oxide. In a number of embodiments, the diffusion barrier layer includes aluminum oxide. In several embodiments, the aluminum oxide is present in the form of a layer having a thickness of less than approximately 30 μm.

The catalyst can be any suitable catalyst that can promote the growth of carbon nanotubes. For example, in many embodiments, the catalyst is one of: iron, nickel, copper, chromium, aluminum, and mixtures thereof. The patterning (102) of the catalyst onto the substrate can be accomplished in any suitable way and in any suitable pattern. For example, in many embodiments, a dot pattern is created using a standard lift off process. In many embodiments, the catalyst is patterned onto the substrate in a dot pattern such that the carbon nanotubes that are thereafter grown are in the form of bundles of carbon nanotubes that each have a diameter of between approximately 1 µm and 2 µm, and are spaced apart from one another at a distance of approximately 5 µm.

Carbon nanotubes are then grown (104) onto at least a portion of the patterned catalyst regions. Any suitable technique can be used to facilitate the growth of the carbon nanotubes. For example, chemical vapor deposition techniques can be used. Any suitable growth gas can be used in conjunction with the chemical vapor deposition techniques. For example in many embodiments, a hydrocarbon is used. In many embodiments the growth gas is one of: ethylene, acetylene, methane, and mixtures thereof. In many embodiments, the carbon nanotubes are grown at a temperature of between approximately 575° C. and 775° C. The growth time can vary based upon the desired height of the carbon nanotubes. In many embodiments, the growth time is approximately 30 minutes. In a number of embodiments, the carbon nanotubes are grown such that they have a height of between approximately 25 micrometers and 50 micrometers. When grown in this way, the carbon nanotubes can maintain an orientation that is substantially orthogonal to the surface of the substrate. This alignment can promote field emission characteristics.

The substrate is heated (106) such that it softens and at least a portion of at least one of the grown carbon nanotubes becomes enveloped by the substrate. In many embodiments, the substrate softens to an extent that it envelopes at least a portion of at least one carbon nanotube's sidewall. For instance, in some embodiments, at least one carbon nanotube at least partially sinks into the softened substrate. This adjoining can be considered to be akin to welding. In many embodiments, the substrate (and by extension carbon nanotubes) is heated in a furnace, and the furnace is purged of any growth gases prior to the heating of the substrate. For instance, argon may be used to purge the furnace. In many embodiments, the furnace is heated to an elevated temperature to heat the substrate. In a number of embodiments, the furnace is held at the elevated temperature for between approximately 15 minutes and approximately 30 minutes. In many embodiments, where the substrate includes Titanium, the elevated temperature that the furnace is heated to is approximately 1050° C. It has been determined that this temperature is sufficient to cause the desired effect. Accordingly, upon cooling, the substrate and any CNTs that are enveloped by the substrate are substantially adjoined and can thereafter withstand more rigorous operating environments. For example, in many embodiments, the CNTs are sufficiently adjoined to the substrate such that typical electric fields that the CNTs are subject to during operation are not sufficient to detach the adjoined CNTs from the substrate. For example, in many embodiments, the CNTs are sufficiently adjoined to the substrate such that an electric field of approximately 3 V/µm is insufficient to detach the adjoined CNTs from the substrate. In many embodiments, CNTs are adjoined to the substrate to an extent that pressures of approximately 60 kPa are insufficient to detach the CNTs from the substrate.

Of course it should be understood that although a process for developing robust field emitters has been described, there exist many variations of the process, and the above description should be considered as illustrative and not comprehensive. For example, the substrate can include any suitable material, and is not restricted to titanium. For example, in many embodiments, the substrate includes a material that has favorable welding characteristics and that does not contaminate the growth of the carbon nanotubes.

Figure 2A:
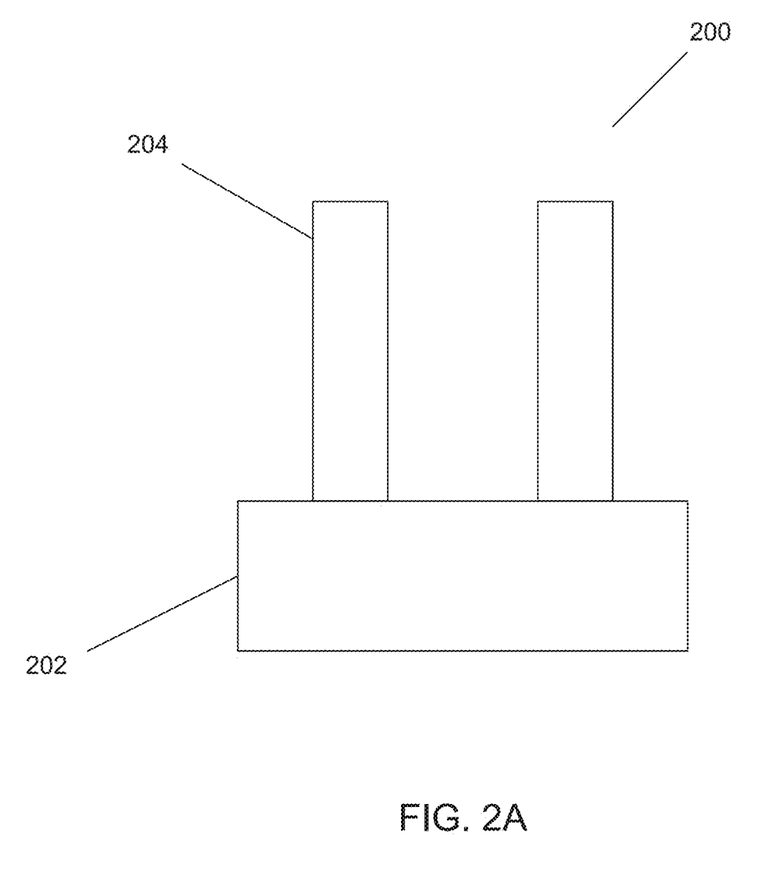
FIGS. 2A-2C diagram advantageously adhering carbon nanotubes to a substrate in accordance with embodiments of the invention.
Figure 2B:
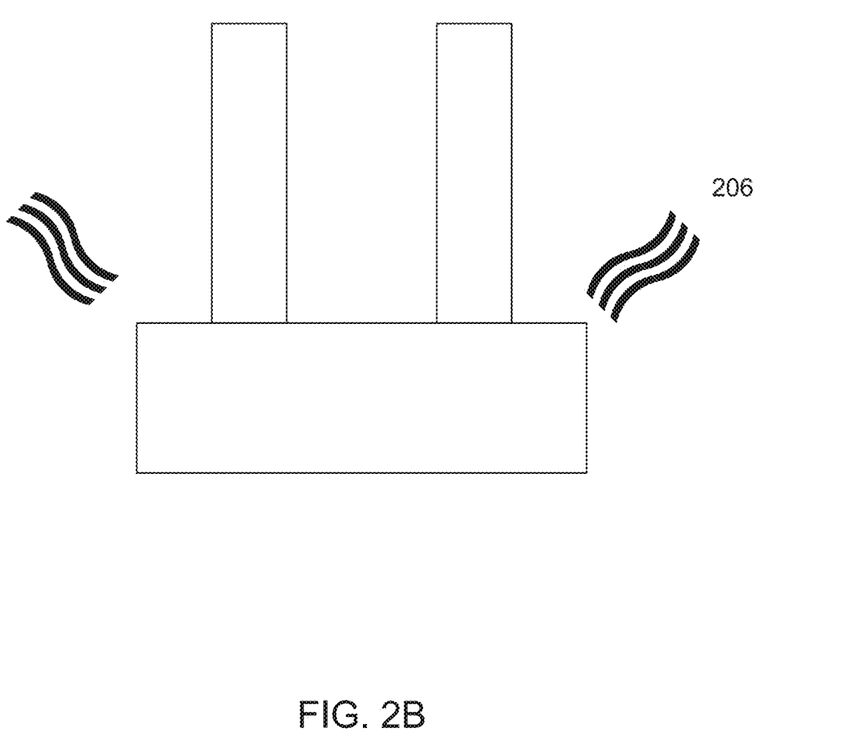
Figure 2C:
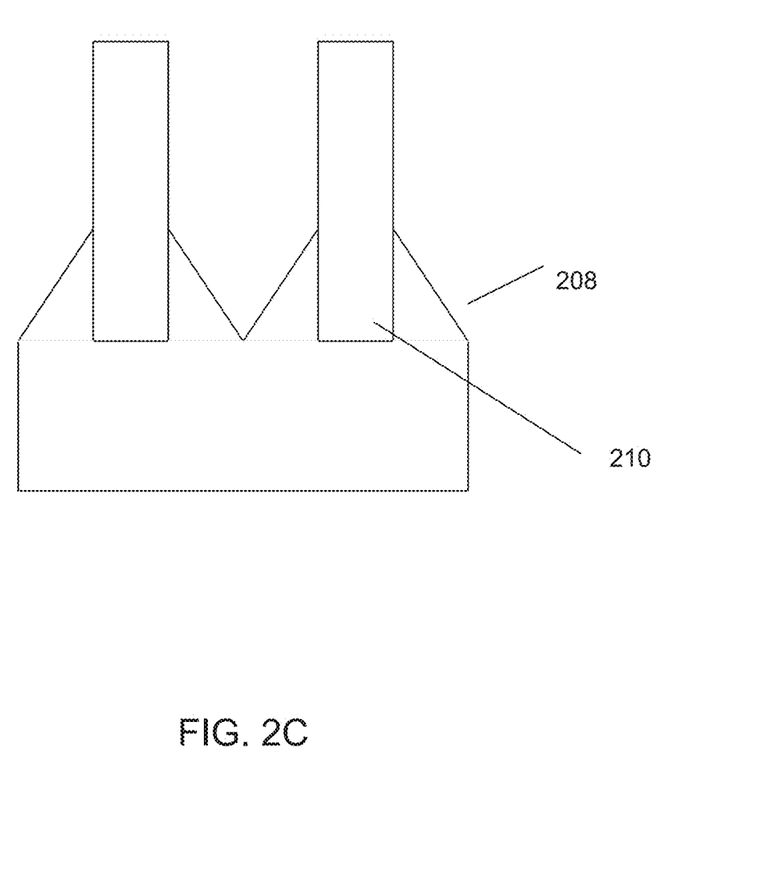

For clarity, FIGS. 2A-2C illustrate some of the processing steps that can be implemented in accordance with embodiments of the invention. In particular, FIG. 2A depicts a field emitter 200 where the carbon nanotubes 204 have been grown onto a substrate 202. FIG. 2B depicts the application of heat 206 to the substrate so as to soften it. FIG. 2C depicts the results of the heating process—in particular is illustrated that a portion of the substrate 208 has enveloped at least some portion of the carbon nanotube walls. Thus, the CNTs 204 can be better adhered to the substrate 202 and thereby result in a more robust field emitter.

Figure 3A:
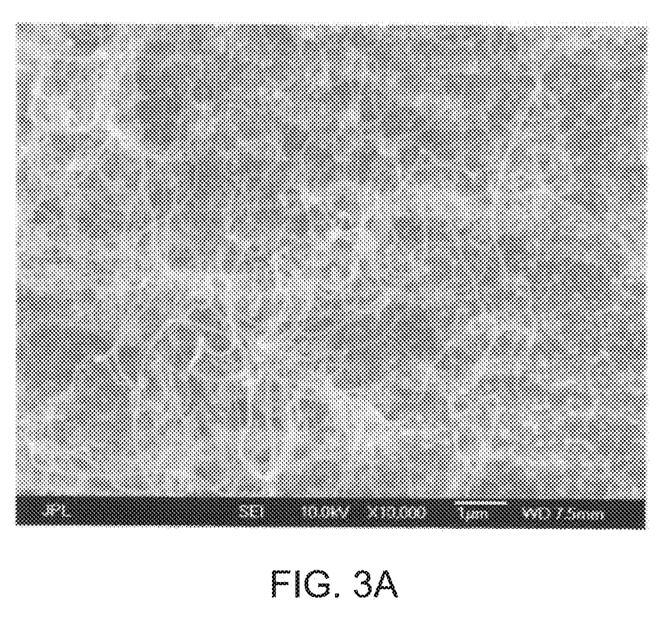
FIGS. 3A-3B illustrate before and after pictures of carbon nanotubes that were adhered to a substrate in accordance with embodiments of the invention, where the carbon nanotubes were grown at 775° C.
Figure 3B:
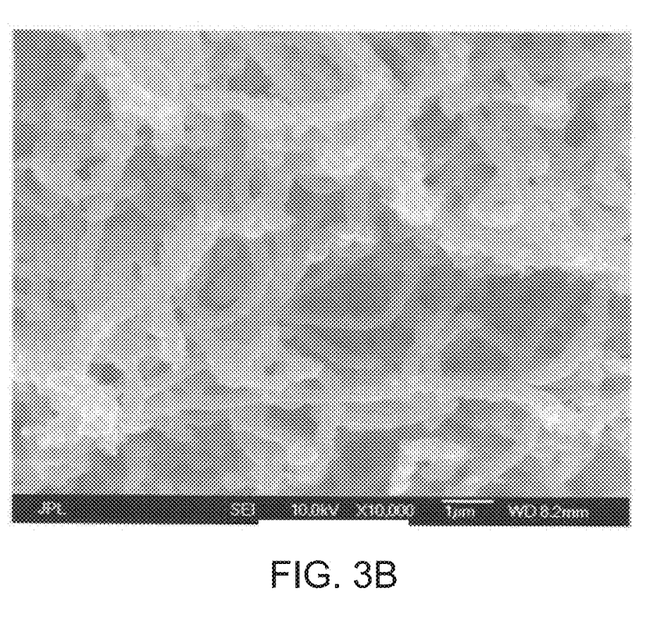
Figure 3C:
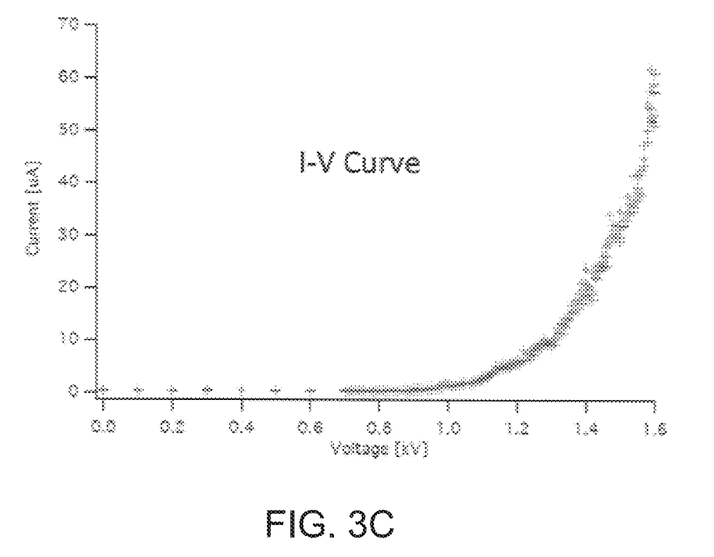
FIG. 3C depicts the results of an IV plot for the field emitter depicted in FIG. 3B when it is operated as a diode.
Figure 3D:
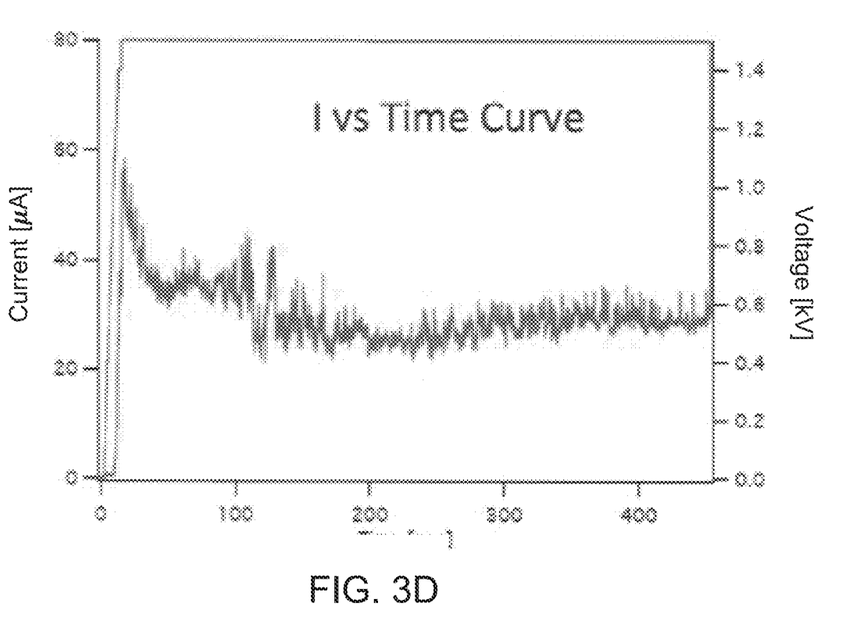
FIG. 3D depicts the results of a current vs. time plot for the field emitter depicted in FIG. 3B when it is operated as a diode.

The scope of the invention can be further understood with respect to the following examples of robust field emitters that were developed in accordance with embodiments of the invention. In particular, FIGS. 3A-3D illustrate the characteristics of a robust field emitter that was developed in accordance with embodiments. Specifically, the field emitter was developed using a titanium substrate, an aluminum oxide diffusion barrier layer, and an iron catalyst. The carbon nanotubes were grown at a temperature of approximately 775° C. FIG. 3A is an SEM image of the carbon nanotubes before the substrate was heated, while FIG. 3B is an SEM image of the carbon nanotubes after the substrate was heated. FIG. 3C illustrates the corresponding I-V curve using the field emitter as a diode. During testing, currents as high as 100 µA were reached. FIG. 3D illustrates a corresponding current vs. time curve. Note that the field emitter was able to sustain the current.

Figure 4A:
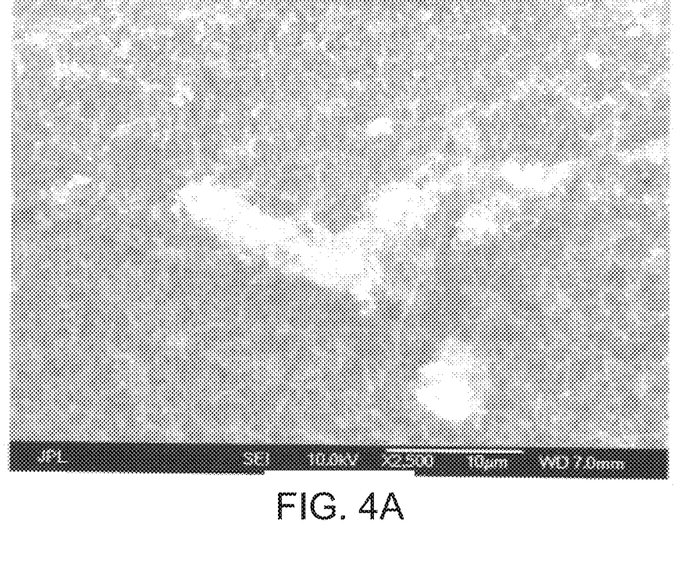
FIGS. 4A-4B illustrate before and after pictures of carbon nanotubes that were adhered to a substrate in accordance with embodiments of the invention, where the carbon nanotubes were grown at 750° C.
Figure 4B:
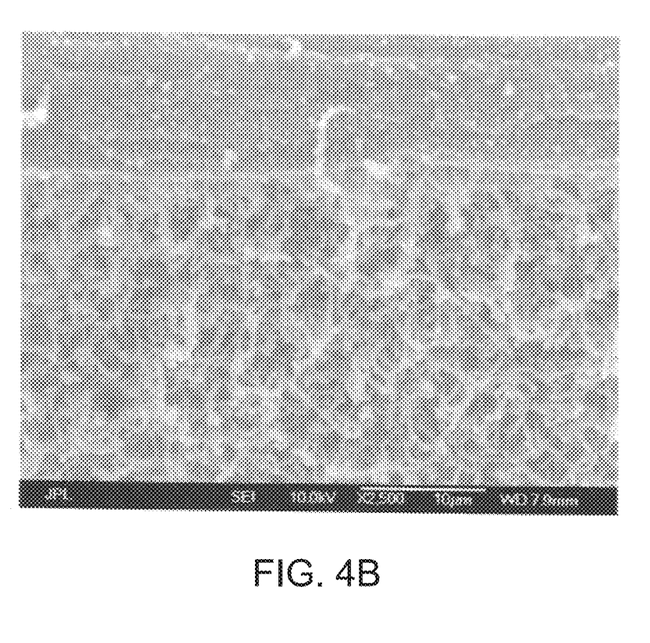
Figure 4C:
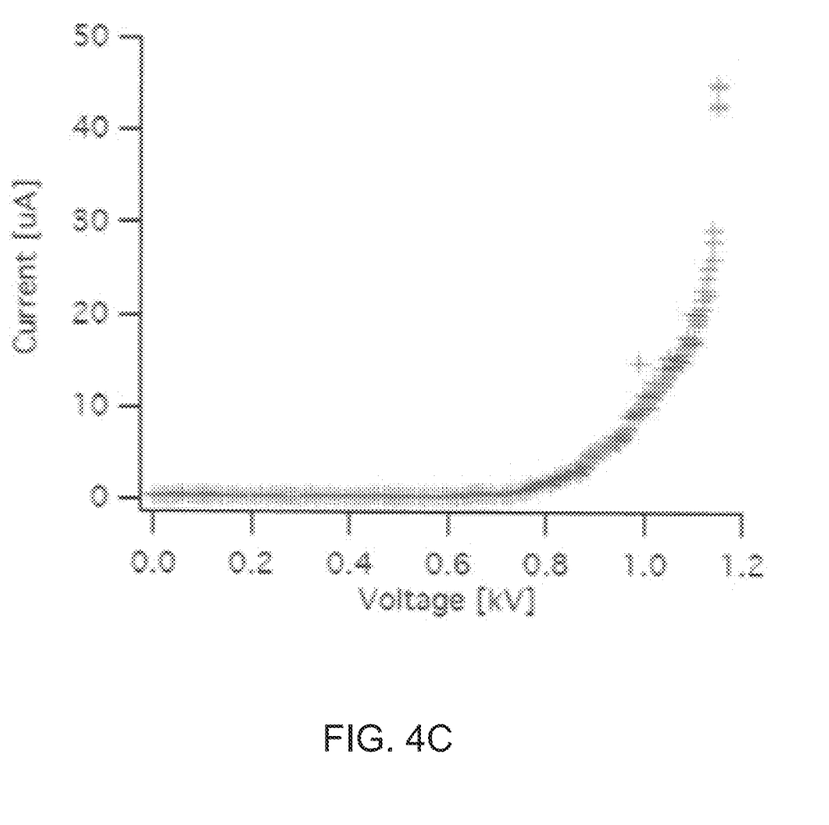
FIG. 4C depicts the results of an IV plot for the field emitter depicted in FIG. 4B.
Figure 4D:
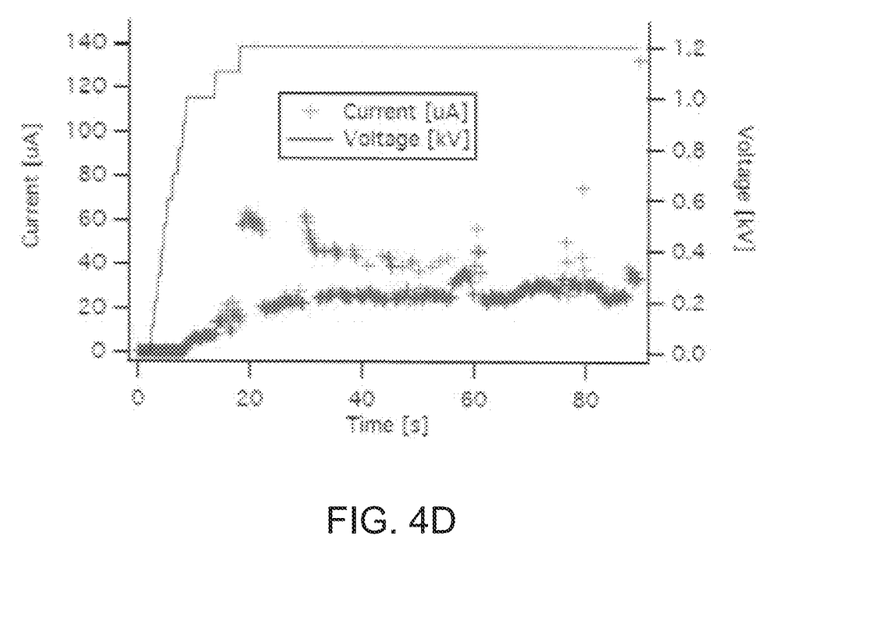
FIGS. 4D-E depict the results of current vs. time plots for the field emitter depicted in FIG. 4B when it is operated as a diode where the maximum applied voltage was 1.2 V and 1.0 V respectively.
Figure 4E:
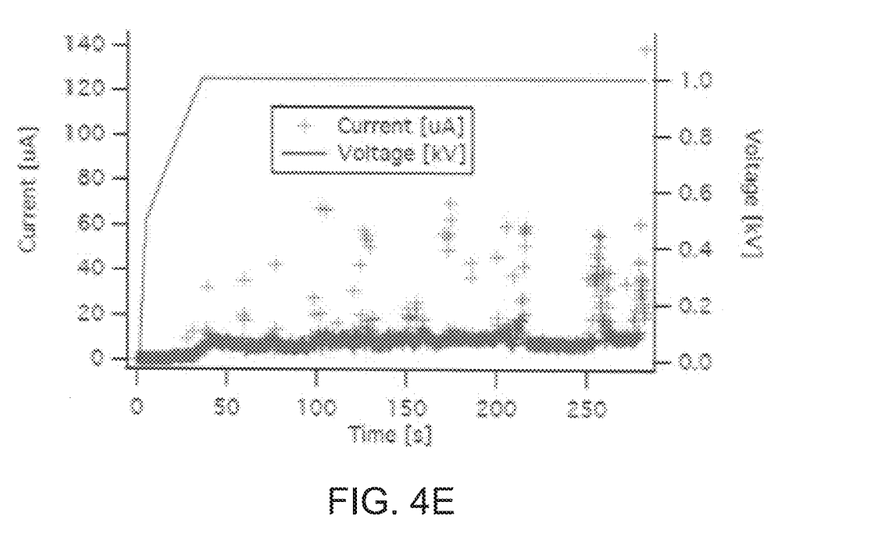

Similarly, FIGS. 4A-4E illustrate the characteristics of a second robust field emitter that was developed in accordance with embodiments. Again, the field emitter was developed using a titanium substrate, an aluminum oxide diffusion barrier layer, and an iron catalyst. The carbon nanotubes were grown at a temperature of approximately 750° C. FIG. 4A is an SEM image of the carbon nanotubes before the substrate was heated, while FIG. 4B is an SEM image of the carbon nanotubes after the substrate was heated. FIG. 4C illustrates the corresponding I-V curve using the field emitter as a diode, FIGS. 4D and 4E illustrate corresponding current vs. time curve at voltages of 1.2 kV and 1.0 kV respectively. Again, note that the field emitter was able to sustain the current.

Advanced processing techniques for developing robust field emitters are now discussed below.

Advanced Techniques for Developing Robust CNT-based Field Emitters

Figure 5:
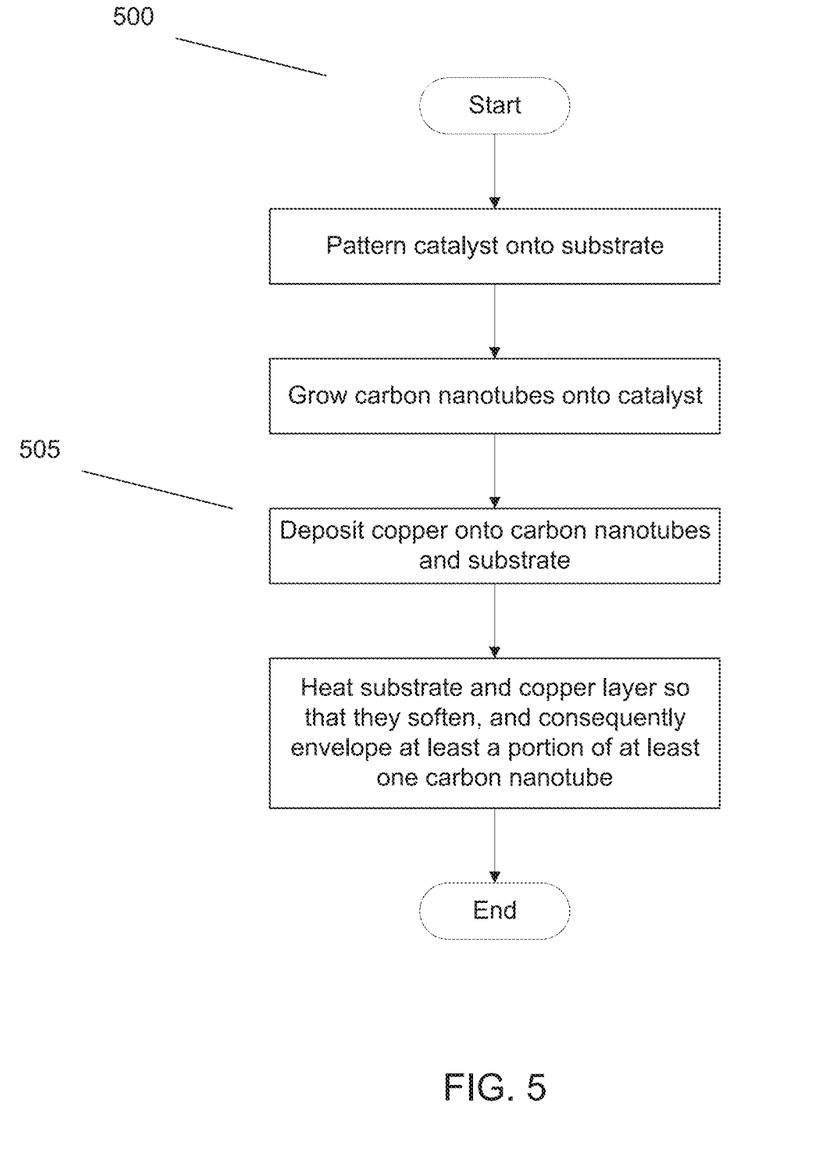
FIG. 5 illustrates a process for fabricating a carbon nanotube field emitter that includes depositing an additional metallic layer prior to heating the substrate material to soften it in accordance with embodiments of the invention

As can be inferred from the above discussion, the process outlined above can be modified in any number of ways in accordance with embodiments of the invention. In some embodiments, prior to the softening of the substrate, an additive material is deposited onto the substrate and the grown carbon nanotubes. For example, in many embodiments, copper is used as the additive material. FIG. 5 illustrates a process for fabricating a robust CNT-based field emitter that includes depositing copper onto the substrate and the grown carbon nanotubes prior to softening the substrate. In particular the process 500, is similar to that seen in FIG. 1, except that it includes depositing (505) copper onto the substrate and the carbon nanotubes prior to softening the substrate. In many instances a copper layer of approximately 5000 Å is deposited on to the grown carbon nanotubes and substrate. It has been determined that the deposition of copper in this manner can enhance the characteristics of the resulting CNT-based field emitter. It is believed that when the substrate is thereafter heated and softened, the copper is softened to a greater extent and thereby can better affix the grown CNTs to the substrate.

In this way, the deposition of copper can overcome the problems associated with the thick oxide that can enable tall vertically aligned CNT growth. Moreover, in many instances the deposition of copper ultimately resulted in copper particles developing on the grown carbon nanotubes, and thereby improving the emission characteristics of the CNTs (e.g. by increasing the density of emission sites).

Note that above described processes can be implemented with any of a variety of suitable materials. For instance, it is not necessary that copper be used as the additive material; for instance titanium can be used as the additive material, even where the base substrate includes titanium. More generally, it should be understood that the above described systems and methods are meant to be illustrative and not meant to be a comprehensive definition of the scope of invention. In general, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of fabricating a carbon nanotube-based field emitter, comprising:
    patterning a substrate with a catalyst;
        wherein the substrate has thereon disposed a diffusion barrier layer;
    growing a plurality of carbon nanotubes on at least a portion of the patterned catalyst; and
    heating the substrate, in the absence of any growth gases, to an extent where it begins to soften such that at least a portion of at least one carbon nanotube becomes enveloped by the softened substrate.

2. The method of claim 1, wherein the catalyst comprises one of: Fe, Cu, Cr, and Al.

3. The method of claim 1, wherein the substrate comprises a metallic material.

4. The method of claim 1, further comprising allowing the grown carbon nanotubes and the softened substrate to cool to room temperature.

5. The method of claim 4, wherein the substrate comprises titanium.

6. The method of claim 5, wherein the diffusion barrier layer comprises aluminum oxide.

7. The method of claim 5, wherein the catalyst is patterned on to the substrate in the form of a plurality of dots.

8. The method of claim 6, wherein the diffusion barrier layer has a thickness of less than approximately 30 angstroms.

9. The method of claim 7, wherein the catalyst pattern is created using a lift-off process.

10. The method of claim 7, wherein the grown plurality of carbon nanotubes are in the form of bundles of carbon nanotubes, wherein each bundle of carbon nanotubes corresponds with one dot.

11. The method of claim 7, wherein the carbon nanotubes are grown using a gaseous hydrocarbon.

12. The method of claim 9, wherein the thickness of the patterned catalyst is less than approximately 35 angstroms.

13. The method of claim 12, wherein the gaseous hydrocarbon is one of:
    ethylene, acetylene, methane, and mixtures thereof.

14. The method of claim 10, wherein the diameter of each bundle of carbon nanotubes is between approximately 1 micrometer and 2 micrometers.

15. The method of claim 10, wherein the carbon nanotubes are grown at a temperature from between 575° C. and 775° C.

16. The method of claim 10, wherein the carbon nanotubes are grown for a duration of approximately 30 minutes.

17. The method of claim 10, wherein the carbon nanotubes are grown to a height of between approximately 25 micrometers and 50 micrometers.

18. The method of claim 10, further comprising subjecting the grown carbon nanotubes and the substrate to an argon flow prior to heating the substrate to an extent that it begins to soften.

19. The method of claim 14, wherein an edge of each bundle of carbon nanotubes is approximately 5 micrometers away from the nearest edge of an adjacent bundle of nanotubes.

20. The method of claim 18, wherein the heating of the substrate to an extent that it begins to soften occurs in an environment comprising a substantially inert gas.

21. The method of claim 20, wherein the substantially inert gas is argon.

22. The method of claim 21, wherein the substrate is heated to 1050° C.

23. The method of claim 22, wherein the substrate is heated for between approximately 15 minutes and approximately 30 minutes.

24. A method of fabricating a carbon nanotube-based field emitter, comprising:
    patterning a substrate with a catalyst;
        wherein the substrate comprises titanium;
        wherein the substrate has thereon disposed a diffusion barrier layer; and
        wherein the catalyst is patterned on to the substrate in the form of a plurality of dots;
    growing a plurality of carbon nanotubes on at least a portion of the patterned catalyst;
        wherein the grown carbon nanotubes are in the form of bundles of carbon
        nanotubes, each bundle of carbon nanotubes corresponding with one dot; subjecting the grown carbon nanotubes and the substrate to an argon flow; heating the substrate in an environment comprising a substantially inert gas to an extent where the substrate begins to soften such that at least a portion of at least one carbon nanotube becomes enveloped by the softened substrate; and allowing the grown carbon nanotubes and the softened substrate to cool to room temperature.

25. The method of claim 24, wherein the substantially inert gas is Argon.

26. The method of claim 24, wherein the substrate is heated to 1050° C.

27. The method of claim 24, wherein the substrate is heated for between approximately 15 minutes and approximately 30 minutes.

28. A method of fabricating a carbon nanotube-based field emitter, comprising:
    patterning a substrate with a catalyst;
        wherein the substrate comprises a metallic material;
        wherein the substrate has thereon disposed a diffusion barrier layer; and wherein the catalyst is patterned on to the substrate in the form of a plurality of dots;
growing a plurality of carbon nanotubes on at least a portion of the patterned catalyst;
wherein the grown carbon nanotubes are in the form of bundles of carbon
nanotubes, each bundle of carbon nanotubes corresponding with one dot; subjecting the grown carbon nanotubes and the substrate to an argon flow; heating the substrate in an environment comprising a substantially inert gas to an extent where the substrate begins to soften such that at least a portion of at least one carbon nanotube becomes enveloped by the softened substrate; and allowing the grown carbon nanotubes and the softened substrate to cool to room temperature.

* * * * *